Patented June 5, 1951

2,555,761

UNITED STATES PATENT OFFICE 2,555,761

RECOVERY OF STREPTOMYCIN FROM NAPHTHOL BLUE-BLACK SALT

Peter P. Regna, West New York, N. J., and Isaiah A. Solomons, III, Jackson Heights, N. Y., assignors to Chas. Pfizer & Co., Inc., Brooklyn, N. Y., a corporation of New Jersey No Drawing. Application May 14, 1947, Serial No. 748,129

4 Claims. (Cl. 260—210)

This invention relates to the recovery of streptomycin from streptomycin dye salts, and it has for its object to provide a novel and improved process for this purpose.

Another object of the invention is to provide an efficient and economical method of separating streptomycin of high antibiotic activity from streptomycin dye salts.

Still another object is to separate streptomycin salts of high antibiotic activity from streptomycin-Naphthol Blue-Black salt which may be precipitated directly from crude aqueous solutions of streptomycin, such as fermentation broths.

Various other objects and advantages will be apparent as the nature of the invention is more fully disclosed.

Streptomycin, an antibiotic produced by cultures of Streptomyces griseus, is a highly potent anti-bacterial agent which is effective against a wide variety of pathogenic organisms. Clinical indications for the use of streptomycin have been observed in urinary tract infections due to gram negative microorganisms, influenza bacillus meningitis, tracheobronchitis and pneumonia, tularemia, ophthalmic infections due to Ps. pyocyaneus, peritonitis due to gram negative organisms, and certain gram negative bacillary infections. Promising results have been obtained also in studies of tuberculosis.

It is known to adsorb streptomycin or its salts from solutions upon activated carbon, and to elute it therefrom with solvents adjusted to a pH below neutral, but this procedure yields streptomycin along with much extraneous material since many other substances are simultaneously adsorbed and eluted. For this reason this method gives a product of low potency. It is also possible to prepare streptomycin concentrates by adsorption on zeolites or ion-exchange resins. However, in removing the streptomycin from these adsorbents by sodium or potassium chlorides, the streptomycin becomes contaminated with considerable amounts of these salts which are difficult to remove, and even after separation of the inorganic salts gives concentrates with a low streptomycin potency.

In our copending application, Serial No. 743,456, filed April 23, 1947, now Patent No. 2,538,847, we have disclosed a novel method for the recovery of streptomycin directly from fermentation broths and partially-purified solutions, by combining the streptomycin and similar basic compounds which are present in the fermentation broth with the di-sodium salt of 8-amino-7-p-nitrophenylazo-2-phenylazo-1-naphthol-3,6-disulfonic acid, also known as Naphthol Blue-Black (Color Index #246), the structural formula of which is:

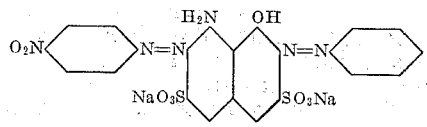

The present invention relates to a method of recovering streptomycin of high antibiotic activity from streptomycin salts of 8-amino-7-p-nitrophenylazo-2-phenylazo-1-naphthol-3,6-disulfonic acid, which comprises mixing said dye salt with a liquid which is a solvent for streptomycin hydrohalides, and reacting said mixture with a metal halide to precipitate a metal salt of 8-amino-7-p-nitrophenylazo-2-phenylazo-1-naphthol-3,6-disulfonic acid and form a solution of a streptomycin hydrohalide.

Our preferred method of accomplishing the metathesis reaction of streptomycin-Naphthol Blue-Black into its two components is to suspend the streptomycin-dye in alcohols, ethers of ethylene glycol ("cellosolves"), water or mixtures of water with acetone, alcohols and ethers of ethylene glycol. To the mixture is then added barium chloride, so as to precipitate the barium salt of Naphthol Blue-Black and leave the soluble streptomycin trihydrochloride in solution. Instead, however, of using barium chloride, other alkaline earth halides, such as calcium, strontium and magnesium, or other metal halides, such as zinc, cadmium, lead, etc., can be employed. The necessary conditions are that the streptomycin hydrohalide formed in the reaction is soluble in the alcohol, water, or other solvent, and that the metal-Naphthol Blue-Black salt is more insoluble than streptomycin-Naphthol Blue-Black. The metathesis reaction can be carried out even at elevated temperatures.

If it is desired to recover the streptomycin as the sulfate, from a solution of the streptomycin hydrohalide, this can be accomplished by the addition of triethylamine sulfate, in which case the streptomycin sulfate is removed by filtration, leaving the triethylamine hydrohalide in solution. Any soluble amine sulfate may be employed in the precipitation (see our copending application, Serial No. 674,394, filed June 4, 1946, now Patent No. 2,537,941).

The microbiological assays on the streptomycin, hereinafter referred to, were carried out using Escherichia coli and Bacillus subtilis similar to those employed for penicillin assays. The B. subtilis plate assay is carried out by the method of Schmidt and Moyer (J. Bact., vol. 47, p. 199 (1944)), and the E. coli turbidimetric assay by the procedure of McMahan (J. Biol. Chem., vol. 153, p. 249 (1944)).

Other break-up procedures in which the streptomycin-Naphthol Blue-Black salt is first partially dissolved in acetone-water mixtures, methanol-water mixtures, and other solvent mixtures, such as water-propanol, water-methyl "cellosolve," etc., take place, as described in the following examples. The conditions and situations described herein prevail in the case of streptomycin-Naphthol Blue-Black salts which have been obtained from fermentation broths, from eluates of adsorbents and from solutions of partially-purified streptomycin.

Example 1

One hundred liters of a filtered streptomycin fermentation broth (118 mcg./ml.) was adjusted to pH 5.4 with sulfuric acid and to it was added 700 g. of "supercel" (a diatomaceous earth filter aid) and 250 g. of Naphthol Blue-Black. This large amount of filter aid is not necessary for purposes of aiding the filtration, but is a means of keeping the precipitate well dispersed in the subsequent conversion of the streptomycin-Naphthol Blue-Black salt. The mixture was stirred for one-half hour and filtered, and the filtrate, which contained 10.0 mcg./ml. of streptomycin (8.5%), was discarded. The streptomycin-Naphthol Blue-Black cake was partially dried on a Buechner funnel, and was then divided into a number of portions from which the streptomycin was recovered, as described immediately below as well as in Examples 2 to 4 inclusive.

A portion (5%) of the wet streptomycin-Naphthol Blue-Black cake was suspended in 500 ml. of methanol, containing 4 g. of barium chloride and stirred for two hours. The precipitated barium salt of the dye was filtered and washed with methanol, and the filtrate contained 500,000 mcg. (85% step yield) of streptomycin trihydrochloride. Triethylamine sulfate was added to the filtrate until precipitation was complete. The combined precipitates were filtered and suspended in water to remove the streptomycin sulfate from the barium sulfate. The latter was filtered, and the aqueous solution, containing the streptomycin sulfate, was frozen, dried under high vacuum and further dried in vacuo over barium oxide. The dried material when assayed against the Food and Drug Administration working standard gave an average potency of 485 mcg./mg. by the B. subtilis agar plate and the E. coli turbidimetric methods.

In place of barium chloride, equivalent amounts of calcium chloride or strontium chloride can be used. In addition, the corresponding alkaline-earth bromides may be employed yielding streptomycin trihydrobromide and the insoluble akaline-earth salts of Naphthol Blue-Black. Furthermore, heavy metal halides, such as aluminum chloride, ferric chloride, zinc bromide, manganese chloride, copper chloride, etc., are also suitable for this purpose. The conversion can be carried out, also, at elevated temperature, thereby greatly shortening the reaction time.

Example 2

Fifty grams of the wet streptomycin-Naphthol Blue-Black cake, obtained as described in Example 1, was suspended in 150 ml. of methanol, containing 4 g. of strontium chloride and stirred for three hours. The strontium-Naphthol Blue-Black salt was filtered, and to the filtrate was added sufficient triethylamine sulfate to precipitate streptomycin sulfate and strontium sulfate. The combined precipitates were suspended in water and an equal amount of methanol was slowly added with stirring. The precipitated strontium sulfate was filtered. The filtrate was then poured into a large volume of methanol and the precipitated streptomycin sulfate was filtered and dried in vacuo over barium oxide. The dried streptomycin sulfate when assayed against the Food and Drug Administration working standard gave an average potency of 480 mcg./mg. by the B. subtilis agar plate and the E. coli turbidimetric methods.

Example 3

Fifty grams of the wet streptomycin-Naphthol Blue-Black cake, obtained as described in Example 1, was suspended in 300 ml. of a 1:1 acetone-water mixture, and treated with 3.5 g. of barium chloride dissolved in water. The precipitated barium-Naphthol Blue-Black was further increased on evaporation of the acetone. The barium-Naphthol Blue-Black and "supercel" were then filtered and the filtrate was evaporated, almost to dryness, in vacuo. The residue was triturated with methanol, and the excess barium chloride was filtered. The streptomycin trihydrochloride filtrate was diluted with water, the methanol was distilled in vacuo, and the aqueous solution was frozen, dried under high vacuum and further dried in vacuo over barium oxide. The dried streptomycin trihydrochloride when assayed against the Food and Drug Administration working standard gave an average potency of 480 mcg./mg. by the B. subtilis agar plate and the E. coli turbidimetric methods.

Example 4

Fifty grams of the wet streptomycin-Naphthol Blue-Black cake, obtained as described in Example 1, was dissolved in 200 ml. of 3:2 methyl "cellosolve"-water mixture and treated with an aqueous solution containing 3.5 g. of calcium chloride. The precipitated calcium-Naphthol Blue-Black and the "supercel" was removed by filtration and the filtrate was found to contain 90% of the streptomycin. The solution was then diluted with fresh methyl "cellosolve" and then treated with an excess of triethylamine sulfate. The combined precipitates of streptomycin and calcium sulfates were removed by filtration, suspended in water and treated with an equal volume of methanol with stirring. The precipitated calcium sulfate was filtered. The filtrate was then poured into a large volume of methanol, and the precipitated streptomycin sulfate was filtered and dried in vacuo over barium oxide. The dried streptomycin sulfate when assayed against the Food and Drug Administration working standard gave an average potency of 520 mcg./mg. by the B. subtilis agar plate and the E. coli turbidimetric methods.

Example 5

To 5 liters of a filtered streptomycin fermentation broth, 120 mcg./ml. at pH 6.8, was added 50 g. of Norite A (a carbon adsorbent). The mixture was stirred for 1 hour and filtered over a "supercel" pre-coated filter. The carbon adsorbate was suspended in 300 ml. of 0.1 N hydrochloric acid and stirred for one-half hour. The mixture was then filtered, and the clear filtrate was neutralized with sodium hydroxide to pH 5.5 and re-filtered. Several of the above adsorption experiments were combined until 2500 ml. were accumulated containing 1.5 g. of streptomycin. To the solution at pH 5.5 was added 30 g. of "supercel" and 12 g. of Naphthol Blue-Black, dissolved in water. After stirring one hour, the whole precipitate was filtered. The filtrate contained 25 mcg./ml. (5%). The precipitate was suction dried on a Buechner funnel and suspended in 500 ml. of methanol (sufficient to make the final solution at least 90% with respect to methanol), containing 1 g. of calcium chloride. The suspension was stirred for several hours in order to convert the Naphthol Blue-Black to the calcium salt and the streptomycin to the trihydrochloride. The calcium-dye salt was filtered and the filtrate found to contain 1.27 g. (85%). To the filtrate was added sufficient triethylamine sulfate to precipitate streptomycin sulfate and calcium sulfate. On filtering the precipitates, the filtrate was found to contain 2% of streptomycin. The combined precipitates were suspended in 65 ml. of water, and an equal volume of methanol was slowly added with stirring; the completely-precipitated calcium sulfate was filtered. The filtrate, containing the streptomycin solution, was diluted with water, the methanol was evaporated in vacuo, and the aqueous solution was frozen, dried under high vacuum and further dried in vacuo over barium oxide. The dried streptomycin sulfate when assayed against the Food and Drug Administration working standard gave an average potency of 580 mcg./mg. by the *B. subtilis* agar plate and the *E. coli* turbidimetric methods.

The invention claimed is:

1. A process which comprises suspending a streptomycin salt of Naphthol Blue-Black in a solvent which is capable of dissolving streptomycin hydrochloride, adding a solution of barium chloride in said solvent in excess of the amount required to precipitate all of the Naphthol Blue-Black as an insoluble barium salt of Naphthol Blue-Black and form a solution of streptomycin hydrochloride, removing the excess of said barium chloride remaining in the solution of the streptomycin hydrochloride and isolating the streptomycin as a metal-free, water-soluble salt of high antibiotic potency.

2. The process of claim 1, in which the solvent is aqueous methanol.

3. The process of claim 1, in which the solvent is aqueous acetone.

4. The process of claim 1, in which the excess of barium chloride is converted to barium sulfate.

PETER P. REGNA.
ISAIAH A. SOLOMONS, III.

REFERENCES CITED

The following references are of record in the file of this patent:

UNITED STATES PATENTS

| Number | Name | Date |
|---|---|---|
| 2,022,678 | Kritchevsky et al. | Dec. 3, 1935 |
| 2,446,102 | Peck | July 27, 1948 |
| 2,462,175 | Folkers | Feb. 22, 1949 |

OTHER REFERENCES

Peck et al., J. A. C. S., vol. 67 (1945), pp. 1866–1867.